United States Patent
Pasquini

(10) Patent No.: US 10,346,538 B2
(45) Date of Patent: *Jul. 9, 2019

(54) AUTOMATIC LOCALE DETERMINATION FOR ELECTRONIC DOCUMENTS

(71) Applicant: Coupa Software Incorporated, San Mateo, CA (US)

(72) Inventor: Matthew Pasquini, San Mateo, CA (US)

(73) Assignee: COUPA SOFTWARE INCORPORATED, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/858,980

(22) Filed: Dec. 29, 2017

(65) Prior Publication Data

US 2018/0165272 A1 Jun. 14, 2018

Related U.S. Application Data

(63) Continuation of application No. 15/282,350, filed on Sep. 30, 2016, now Pat. No. 9,858,258.

(51) Int. Cl.
*G06F 16/81* (2019.01)
*G06F 17/22* (2006.01)
(Continued)

(52) U.S. Cl.
CPC .......... *G06F 17/275* (2013.01); *G06F 16/182* (2019.01); *G06F 16/81* (2019.01);
(Continued)

(58) Field of Classification Search
CPC .................................................. G06F 17/275
See application file for complete search history.

(56) References Cited

U.S. PATENT DOCUMENTS 7,680,646 B2 3/2010 Lux-Pogodalla
8,135,580 B1 3/2012 Jin
(Continued)

OTHER PUBLICATIONS

Xia et al., "Language ID in the Context of Harvesting Language Data Off the Web", Proceedings of the 12th Conference of the European Chapter of the Association for Computer Linguistics.
(Continued)

*Primary Examiner* — Brian L Albertalli
(74) *Attorney, Agent, or Firm* — Hickman Palermo Becker Bingham LLP

(57) ABSTRACT

Automatic locale determination for documents is described. In an embodiment, a computer server receives an electronic document comprising a plurality of unknown-language data elements each associated with one or more types. Based on a document schema of the document, the computer system selects one or more unknown-language data elements from the plurality of unknown-language data elements and assigning to each of the one or more unknown-language data elements a corresponding weight value based on a respective type of the unknown-language data element. The computer system compares the one or more unknown-language data elements with a plurality of known-language data elements that are associated with the document schema and based on the comparing, determines a number of unknown-language data elements in the one or more unknown-language data elements that matched any in a subset of the plurality of known-language data elements, wherein the subset of known-language data elements corresponds to a particular language. Based on the number of data elements that matched to the subset of known-language data elements and based on the corresponding weight assigned to each unknown-language data element in the number of unknown-language data elements, the computer system determines a language confidence level value specifying a level of (Continued)

machine confidence that the document is expressed in the particular language and based on the language confidence value for the particular language exceeding a language threshold value, automatically processes the document using the particular language.

20 Claims, 6 Drawing Sheets

(51) Int. Cl.
*G06F 17/27* (2006.01)
*G06F 16/182* (2019.01)
*G06F 16/9535* (2019.01)

(52) U.S. Cl.
CPC ...... *G06F 16/9535* (2019.01); *G06F 17/2247* (2013.01); *G06F 17/2252* (2013.01); *G06F 17/2765* (2013.01)

(56) References Cited

U.S. PATENT DOCUMENTS

| | | |
|---|---|---|
| 8,812,295 B1 | 8/2014 | Swerdlow |
| 8,942,974 B1 | 1/2015 | Leblang |
| 9,465,799 B2 | 10/2016 | Hughes |
| 2004/0034521 A1 | 2/2004 | Kawakura |
| 2004/0098246 A1 | 5/2004 | Welch |
| 2005/0154578 A1 | 7/2005 | Tong |
| 2006/0271352 A1 | 11/2006 | Nikitin |
| 2008/0172603 A1 | 7/2008 | Agarwal |
| 2011/0071817 A1 | 3/2011 | Siivola |
| 2012/0072204 A1 | 3/2012 | Nasri |
| 2013/0061133 A1 | 3/2013 | Naveh |
| 2017/0154101 A1 | 6/2017 | Raghavan |

OTHER PUBLICATIONS

World Wide Web Consortium. "Internationalization Tag Set (ITS) Version 2.0", dated 2013.
Silva et al., "Addings Geographic Scopes to Web Resources", Computers Environment and Urban Systems 30.4, dated 2006, pp. 378-399.
Phillips, Addison et al., "Tags for Identifying Languages", No. RFC 5646, dated 2009.
Nguyen et al., "Multilingual Schema Matching for Wikipedia Infoboxes" Proceedings of the VLDB Endowment 5.2, dated 2011, pp. 133-144.
Nagamori, et al., "A Multilingual Metadata Schema Registry Based on RDF Schema" International Conference on Dublin Core and Metadata Applications, 2001.
U.S. Appl. No. 15/282,350, filed Sep. 30, 2016, Notice of Allowance dated Aug. 15, 2017.

```xml
<?xml version="1.0"?>
<?mso-application progid="Excel.Sheet"?>
<Workbook xmlns="urn:schemas-microsoft-com:office:spreadsheet"
 xmlns:o="urn:schemas-microsoft-com:office:office"
 xmlns:x="urn:schemas-microsoft-com:office:excel"
 xmlns:dt="uuid:C2F41010-65B3-11d1-A29F-00AA00C14882"
 xmlns:ss="urn:schemas-microsoft-com:office:spreadsheet"
 xmlns:html="http://www.w3.org/TR/REC-html40">
<DocumentProperties xmlns="urn:schemas-microsoft-com:office:office">
 <LastAuthor>Khachik Papanyan</LastAuthor>
 <Created>2016-07-30T02:28:53Z</Created>
 <LastSaved>2016-08-03T18:11:00Z</LastSaved>
 <Paragraphs>de</Paragraphs>
 <Version>16.00</Version>            510
 <Language>de</Language>
</DocumentProperties>
...
<Worksheet ss:Name="NewInfo">
 <Table ss:ExpandedColumnCount="5" ss:ExpandedRowCount="2" x:FullColumns="1"
  x:FullRows="1" ss:DefaultRowHeight="15">
  <Column ss:Width="35.25"/>
  <Column ss:Width="85.5"/>
  <Row>
   <Cell><Data ss:Type="String">RowID</Data></Cell>
   <Cell><Data ss:Type="String">straße</Data></Cell>
   <Cell><Data ss:Type="String">type</Data></Cell>
   <Cell><Data ss:Type="String">amount</Data></Cell>
   <Cell><Data ss:Type="String">date</Data></Cell>
  </Row>
  <Row>
   <Cell><Data ss:Type="Number">1</Data></Cell>
   <Cell><Data ss:Type="String">Bundesplatz 1</Data></Cell>
   <Cell><Data ss:Type="String">Büro</Data></Cell>
   <Cell><Data ss:Type="String">CHF 1,000.00</Data></Cell>
   <Cell><Data ss:Type="String">21/2/2016</Data></Cell>
  </Row>
 </Table>
 </Worksheet>
</Workbook>                                              500
```

FIG. 5

AUTOMATIC LOCALE DETERMINATION FOR ELECTRONIC DOCUMENTS

BENEFIT CLAIM

This application claims the benefit under 35 U.S.C. § 120 as a continuation application of U.S. application Ser. No. 15/282,350, filed Sep. 30, 2016, the entire contents of which is hereby incorporated by reference for all purposes as if fully set forth herein. The applicant hereby rescinds any disclaimer of claim scope in the parent applications or the prosecution history thereof and advise the USPTO that the claims in this application may be broader than any claim in the parent applications.

TECHNICAL FIELD

The general technical field of the present disclosure is computer software programmed computers in distributed systems. The technical field of the disclosure relates more specifically to automatically determining a geographic location or locale for electronic documents in distributed systems in which documents are contributed to the system from different geographic locations.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Increased internationalization in business has coincided with the fast growth in volume of the digital data that is managed using distributed computer systems. Large volumes of documents are constantly harvested, produced, exchanged, and analyzed. To process such large volumes of documents with a computer system that has limited computational resources is challenging. This challenge is further exacerbated when these large volumes of documents have different locales. "Locale," in this context, may mean different languages, different formatting of data for dates, numbers, and other semantics, and different local use of terms either in a particular language or after translation; that is, a particular word, when translated into different languages, may have substantially different meaning in local usage.

In some instances, schemas of documents also may have multiple locales. Localized document schemas make automatic processing of the document especially hard. For example, CSV (Comma-Separated Value) documents may have field names in a foreign language in addition to having foreign language records within the document. Even for semi-structured data based documents, such as XML (eXtensible Markup Language) documents, the tags, elements, and attributes may be defined in a local foreign language. Computer systems that receive and process such documents may fail to recognize schemas without prior knowledge of the locale and may require manual configuration to accurately process the data of the documents. Therefore, in many kinds of distributed systems, accurate operation requires accurately determining the locale to which a document applies.

BRIEF DESCRIPTION OF THE DRAWINGS

In the drawings:

FIG. 5 describes an example of document metadata, according to an embodiment;

DESCRIPTION OF EXAMPLE EMBODIMENTS

Figure 1:
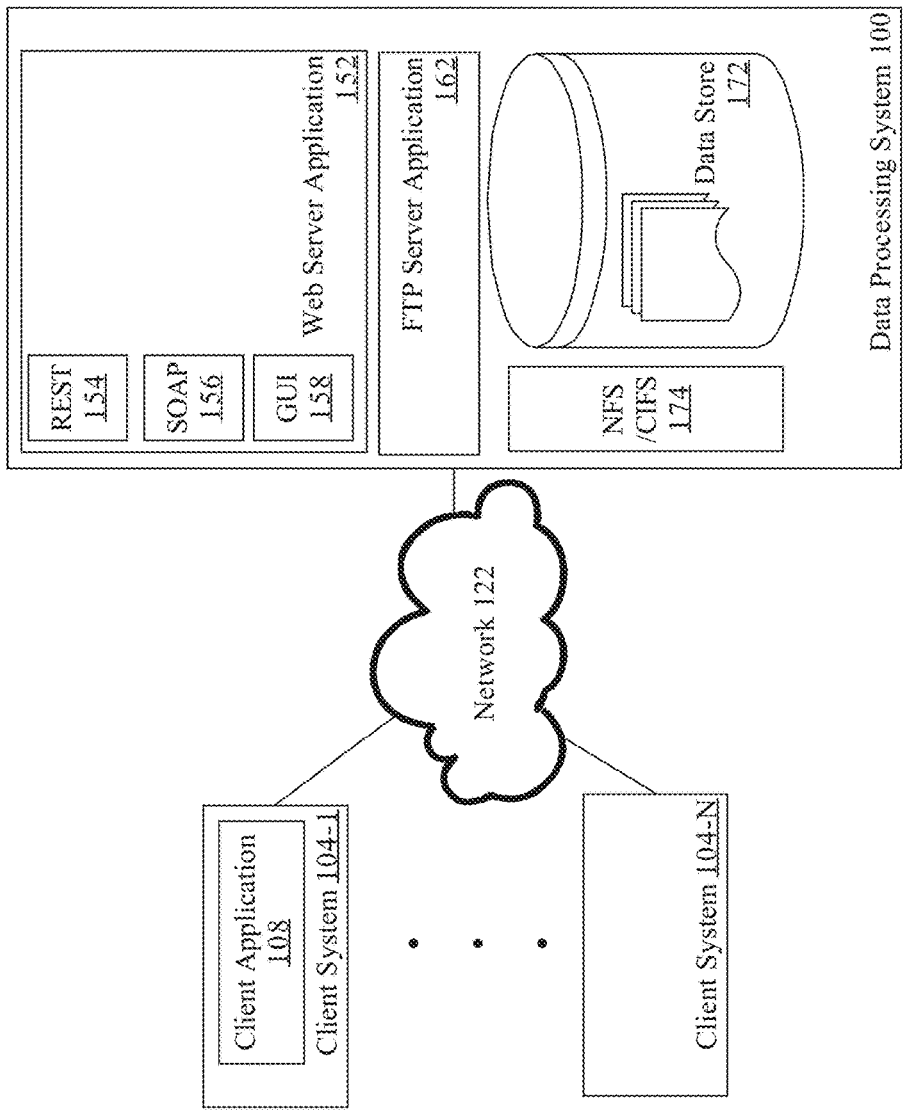
FIG. 1 illustrates an example operating environment upon which an embodiment may be implemented.

Techniques for automatic locale determination for electronic documents are described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure. Embodiments are described herein according to the following outline:

1.0 General Overview
    2.0 Example Operating Environment
    3.0 Functional Description
        3.1 Locale Metadata
        3.2 Language Confidence Based on Document Data Elements
        3.3 Locality Confidence Based on Document Data Elements
        3.2 Selecting Locale for Document
    4.0 Implementation Mechanisms—Hardware Overview
    5.0 Extensions and Alternatives
    1.0 General Overview Automatic locale determination for documents is described. In an embodiment, a computer server receives an electronic document comprising a plurality of data elements in an unknown language, each data element associated with one or more types. Based on a document schema of the document, the computer system selects one or more unknown-language data elements from the plurality of unknown-language data elements and assigning to each of the one or more unknown-language data elements a corresponding weight value based on a respective type of the unknown-language data element. The computer system compares the one or more unknown-language data elements with a plurality of known-language data elements that are associated with the document schema and based on the comparing, determines a number of unknown-language data elements in the one or more unknown-language data elements that matched any in a subset of the plurality of known-language data elements, wherein the subset of known-language data elements corresponds to a particular language.

Based on the number of data elements that matched to the subset of known-language data elements and based on the corresponding weight assigned to each unknown-language data element in the number of unknown-language data elements, the computer system determines a language confidence level value specifying a level of machine confidence that the document is expressed in the particular language and based on the language confidence value for the particular language exceeding a language threshold value, automatically processes the document using the particular language.

One solution to automatically determine a locale of a document is to rely on digitally stored metadata identifying the locale. The term "locale," in this context, means information that identifies the language and/or local data formats of a document, while the term "locale metadata" refers to metadata that represents a locale. The locale metadata may be appended by the computer system that has generated or sent the document for processing. However, the locale metadata identifying the locale of a document may not be accurate.

For example, assume that a distributed computer system hosting a client-server business software application is in use by an international company having multiple branch offices. The headquarters of the company is in one country, and a branch office is located in a different country. The computer systems of the branch office that generate and send documents may set the locale metadata of the documents to represent the country of the branch office, while the content itself may be in a locale of the home country of the company. Accordingly, when a computer system attempts to process the content based on locale metadata field values, the computer system will either fail or incorrectly process the document.

In an embodiment, a document processing system computes locale confidence level value(s) to approximate a level of machine confidence that a received document is expressed in a particular locale. Using such approach, the data processing system may not blindly trust the locale metadata fields of documents to correctly process the document. Rather, the document processing system may use locale metadata as one of many other factors described herein that influences the automatic determination of the locale for the document. The locale metadata may be obtained by examining metadata data elements of the protocol(s) by which the document is received and/or the file(s) in which the document is stored, as well as metadata data elements in the document itself.

A received document may not be associated with any locale metadata, or the locale metadata for a document may not be accurate. For that reason, additionally or alternatively, "unknown-language data elements" within the document are used to determine the locale of the document, in an embodiment. The "unknown-language data element" term refers to a data element within the content of a document for which the processing computer system of the document fails to identify the corresponding language. In one embodiment, all data elements of the document are considered as unknown-language data elements by the processing computer system. In another embodiment, the processing computer system may attempt to process a data element of a document based on the default language of the processing computer system and/or one or more languages identified in the metadata of the document or request. If the processing fails, then the failed one or more data elements are considered unknown-language data elements.

In an embodiment, unknown-language data elements of a document are used to determine language confidence values for one or more languages. The unknown-language data elements may be selected from the document based on the schema of the document. The processing computer system may obtain the schema for the received document based on information in the request to process the document or from the contents of the document itself. Based on the schema, the processing computer system may identify an unknown-language data element as an XML specific tag/attribute, JSON (JavaScript Object Notation) object name/attribute name, CSV field name, or a data value of an enumeration type of known possible values.

The processing computer system may select a set of unknown-language data elements to be compared to a data store containing known-language data elements, in an embodiment. The "known-language data element" term refers herein to a data element for which the language is known. If an unknown-language data element matches with a known-language data element for a particular language, the particular languages confidence value is updated to reflect a higher level of machine confidence that the document is expressed in the particular language. When multiple known-language data terms of corresponding multiple languages are matched to one or more selected unknown-language data elements, then the confidence level for each of the multiple languages for the document is updated to represent a higher level of machine confidence for those languages.

Each update to a locale confidence value, whether based on locale metadata or an unknown-language data element, is given a weight in the calculation of language confidence value(s) for the document, in an embodiment. The weight values may be assigned based on types of unknown-language data elements or metadata data elements. Accordingly, the weight values represent the perceived accuracy of corresponding data elements in determination of the locale of the received document.

After updates to one or more locale confidence values, the locale of the document may be selected based on the determined locale confidence values. The document may be processed according to the locale using one or more document schemas that are particular to the determined locale.

2.0 Example Operating Environment

FIG. 1 illustrates an example operating environment upon which an embodiment may be implemented. In FIG. 1, data processing system (DPS) 100 may comprise one or computer systems that are coupled using network 122 to one or more client systems 104-1, 104-N. Any number of client systems 104-1, 104-N may be deployed in a distributed computing system of this type, as indicated by the designation "N" in 104-N. DPS 100 and client systems 104-1, 104-N may be in two or more different locations such as different states, countries or other geographical or political units.

The DPS 100 hosts, executes or comprises a web server application 152, FTP server application 162, file system 174 and data store 172. In an embodiment, web server application 152 implements a client-server business application, such as a procurement management system, in communication with compatible instances of a client application 108 that are hosted at the client systems 104-1, 104-N. The web server application 152 may include a REST interface 154, SOAP interface 156, and presentation layer or graphical user interface (GUI) 158. The GUI 158 may be programmed to generate HTML documents, vector data, or other data that can be displayed or rendered at the client systems 104-1, 104-N to cause visually displaying data, images, text and the like representing prompts, GUI widgets, output data, reports and the like as part of the business application.

Network 122 broadly represents a digital data telecommunications network comprising any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, client system 104-1 establishes a connection with DPS 100 using one or more protocols to transmit one or more documents for processing by DPS 100. One technique to transmit a document is for client system 104-1 to upload a file containing the document to DPS 100. For example, client system 104-1 may use client application 108 to transmit the file over FTP protocol to FTP server application 162. Upon receipt of the file, FTP server application 162 may store the document file in the client indicated directory of data store 172.

In another embodiment, DPS 100 may expose one or more of its directories coupled to data store 172 through a network file system such as NFS/CIFS 174. Client system 104-1 may mount the network directory using client application 108 and transfer a document file into the mounted directory. The transfer would trigger transmission of a copy of the document file over network 122 to the mounted directory in data store 172.

In yet another embodiment, client application 108 is a web browser which is used by a user of client computer system 104-1 to display graphical user interface 158 of web server application 152 of DPS 100. Through GUI 158, the user may select a file containing the document to be uploaded to DPS 100 and request web server application 152 to initiate the transmission. The request triggers client application 108 to transmit the file using HTTP(s) (Hyper-Text Transfer Protocol) to web server application 152. Upon the receipt, web server application 152 may store the document in data store 172.

Alternatively or additionally, client system 104-1 may transmit a document to DPS 100 through a programming interface of DPS 100. In such an embodiment, client computer system 104-1 connects to DPS 100 using the protocol used by the programming interface and transmits the document using the protocol. For example, client application 108 may use SOAP (Simple Object Access Protocol) or REST (Representational State Transfer) over HTTP(s) to transmit a document to web server application 152 of DPS 100. REST 154 or SOAP 156 plug-in of web server application 152 are used to receive the document and trigger further processing of the document according to the techniques described herein.

In another embodiment, an upload of a document file into data store 172 triggers processing of the document(s). DPS 100 may monitor one or more target directories into which document files may be uploaded. As soon as a new file is detected in the directories, DPS 100 may store one or more documents of the file in data store 172 and process the document(s) to the techniques described herein.

In an embodiment, DPS 100 automatically detects whether a received document file is compressed and if so, automatically decompresses the compressed document file. DPS 100 may use the extension of the received document file to automatically detect whether the document file is compressed and what compression is used. Based on the compression type, DPS 100 may use a respective decompression application to automatically decompress the received document file and extract one or more documents from the file. For example, if DPS 100 identifies the received file having a ".zip" or "0.7z" file extension, then DPS 100 determines that the file is compressed and automatically decompresses the file using the respective decompression application. In another embodiment, DPS 100 may use the header information of the received document file to automatically detect that the document file is compressed. For example, the document file may contain a PKZIP header that would denote to DPS 100 that the received file is compressed using PKZIP compression. In such an example, DPS 100 may use a decompression application supporting PKZIP compression to automatically decompress the received file. Once extracted from a received compressed file, one or more documents are processed using the techniques described herein.

Additionally or alternatively, DPS 100 may similarly automatically determine whether a received document file or document is encrypted and automatically decrypt the received document file or document. For example, if DPS 100 identifies the received file having a ".pgp", ".gpg or ".asc" file extension, then DPS 100 determines that the file is encrypted and automatically decrypts the file using the respective decryption algorithm. In another embodiment, DPS 100 may use the information within a document to automatically detect that the received document is encrypted. For example, the document may contain a "-----BEGIN PGP MESSAGE-----" string that would denote to DPS 100 that the received document is encrypted. In such an example, DPS 100 may automatically decrypt the received document using a PGP decryption algorithm. DPS 100 may maintain one or more keys required for decryption or may access a pre-determined location to retrieve the one or more keys. Once decrypted, one or more documents are processed using the techniques described herein.

In an embodiment, in addition to storing the document(s) received by DPS 100, data store 172 stores known-language data elements, each associated with data indicating the corresponding language in which the known-language data element is expressed. DPS 100 may query data store 172 by providing one or more strings to be compared with known-language data elements and based on the comparison may return one or more matched languages. In an embodiment, data store 172 is implemented as a database management system with one or more data base objects storing known-language data elements and the associated language information.

3.0 Functional Description

Figure 2:
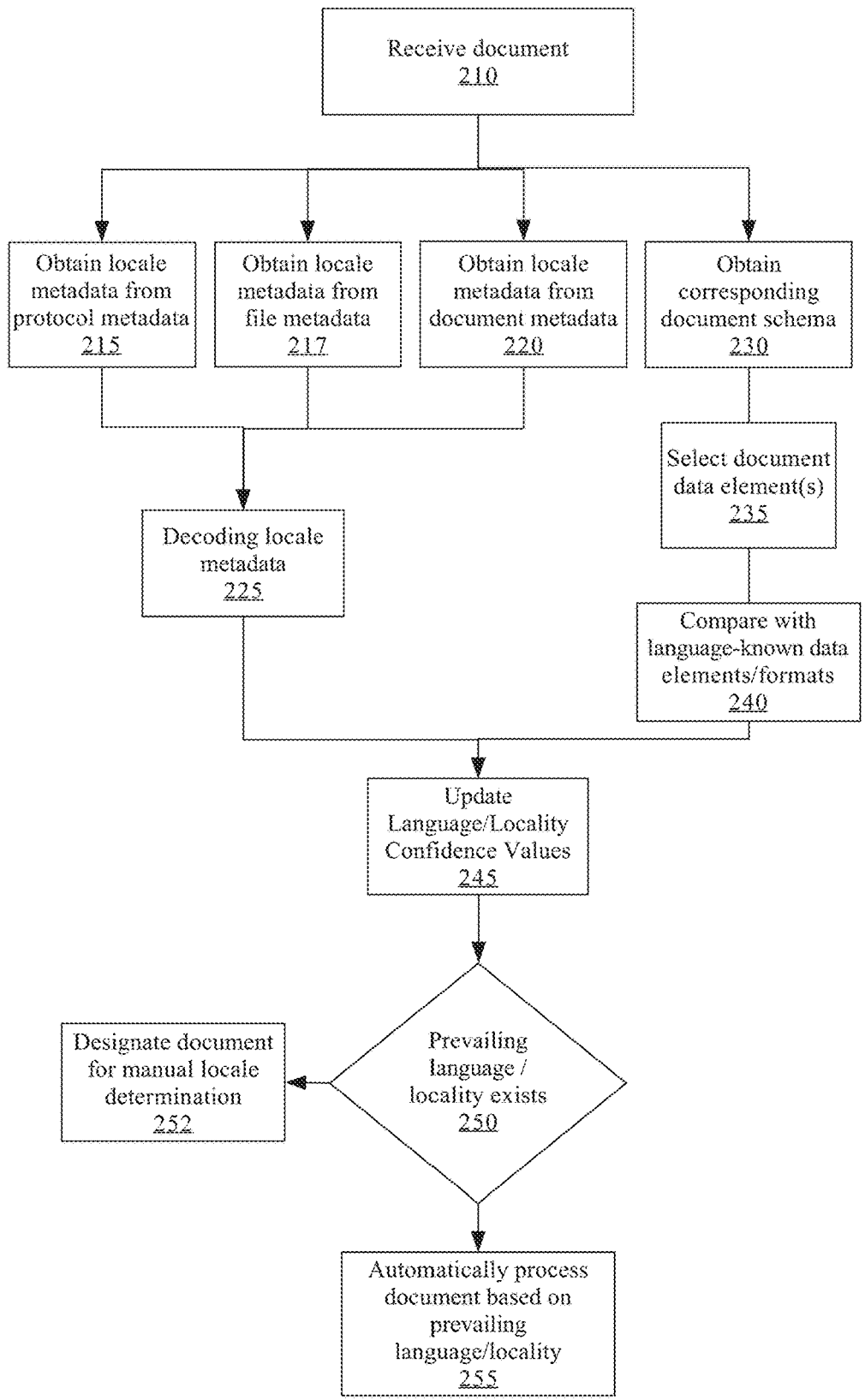
FIG. 2 is a flow diagram that depicts a process for determining the locale of a document, in an embodiment.

FIG. 2 is a flow diagram that depicts a process for determining the locale of a document, in an embodiment. FIG. 2 illustrates an algorithm that may be used as the basis of programming computers to implement the functions that are further described in this section, at the same level of skill that is normally used to communicate program plans, program designs, algorithms or programming methods among persons at the ordinary level of skill to which this disclosure is directed. That is, FIG. 2 is expressed at the same level of detail that persons of skill in this field normally use to communicate with one another about methods, algorithms, plans or specifications for computer programs to implement processes, functions or operations within this technical field.

At block 210, a document is received. For example, DPS 100 may receive the document as part of a request from client application program 108 to process the document. The document may be contained within a separate file or the request itself. A particular locale or locales, with which the document is associated or usable, are not known or encoded in data at the time of block 210.

3.1 Locale Metadata

In an embodiment, client application 108 of client computer system 102 requests DPS 100 to process a transmitted document. At block 215, the process obtains available locale metadata from protocol metadata. For example, DPS 100 evaluates protocol metadata to obtain any locale metadata sent by client application 108, in an embodiment. Such locale metadata may be reflective of the content of the document, particularly the language in which the document is expressed.

At block 225, the process decodes the locale metadata. For example, DPS 100 may parse the locale metadata that was obtained at block 215 to update language confidence level value(s) for the document at block 245. DPS 100 may be configured to parse the locale metadata based on the type of protocol used in the request or the type of request.

Figure 3:
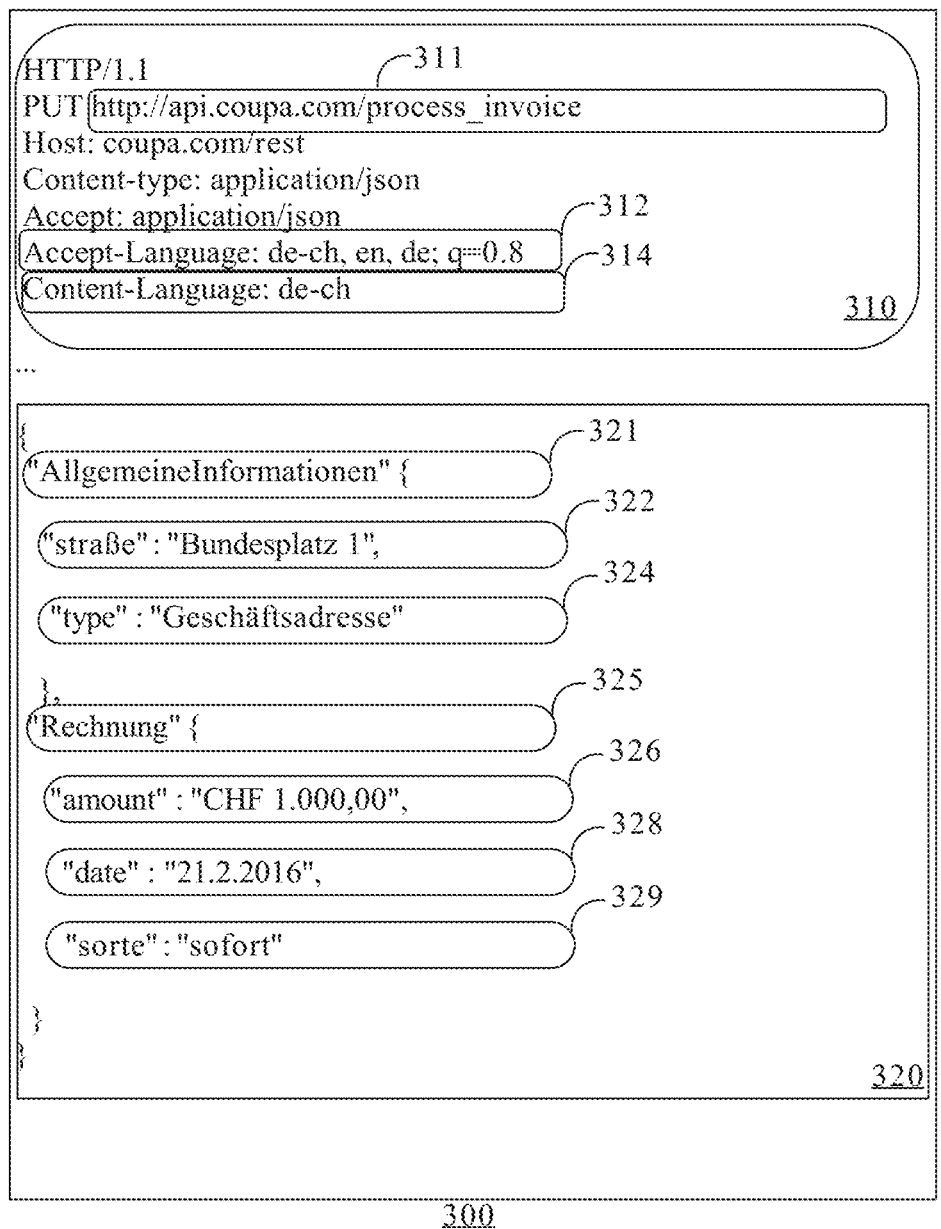
FIG. 3 depicts an example of HTTP request data that contains locale metadata and a document for locale determination processing, according to an embodiment.

For example, if the request is transmitted by an HTTP request using REST, SOAP or another HTTP based protocol, DPS 100 may obtain locale metadata from the HTTP header that has been constructed by the client application 108 when issuing the HTTP request to DPS 100. FIG. 3 depicts an example of HTTP request data 300 that contains sample HTTP header 310 and sample HTTP body with semi-structured JSON document 320, according to an embodiment.

In an embodiment, DPS 100 is configured to obtain locale metadata based on the standards defining the locale metadata for HTTP headers. R. Fielding and J. Reschke, "Hypertext Transfer Protocol (HTTP/1.1): Semantics and Content," RFC 7231, June 2014, describes the content related fields that specify the locale of the content for HTTP. The user of this disclosure is presumed to have read, understood, and be capable of implementing the techniques of RFC 7231. DPS 100 may attempt to obtain locale specific fields including "Accept-Language" or "Content-Language" that contain language and locality code values for the content of the request. The language code values for HTTP headers are described in the ISO-639 family of specifications for each of the world languages.

Continuing with example HTTP header 310 in FIG. 3, in an embodiment, the computer parses a header field to identify a language. For example, DPS 100 parses Accept-Language field 312 from HTTP header 310 determining that three language codes "de-ch" for Swiss German, "en" for general English and "de" for standard German are described. Accordingly, DPS 100 may update a confidence value level for each of these languages.

Similarly, file metadata for the received document may be obtained and parsed for locale metadata. At block 217, the process obtains locale metadata from file metadata. For example, DPS 100 may obtain locale metadata from file metadata based on the file type or the type of request that initiated the processing of the document. At block 225, DPS 100 parses the obtained locale metadata, if any, and parses the attributes of the locale metadata. DPS 100 may be configured to parse the locale metadata attributes based on standards, such as the ISO-639 family of standards specifications, based on the file type and/or based on the request type.

Figure 4:
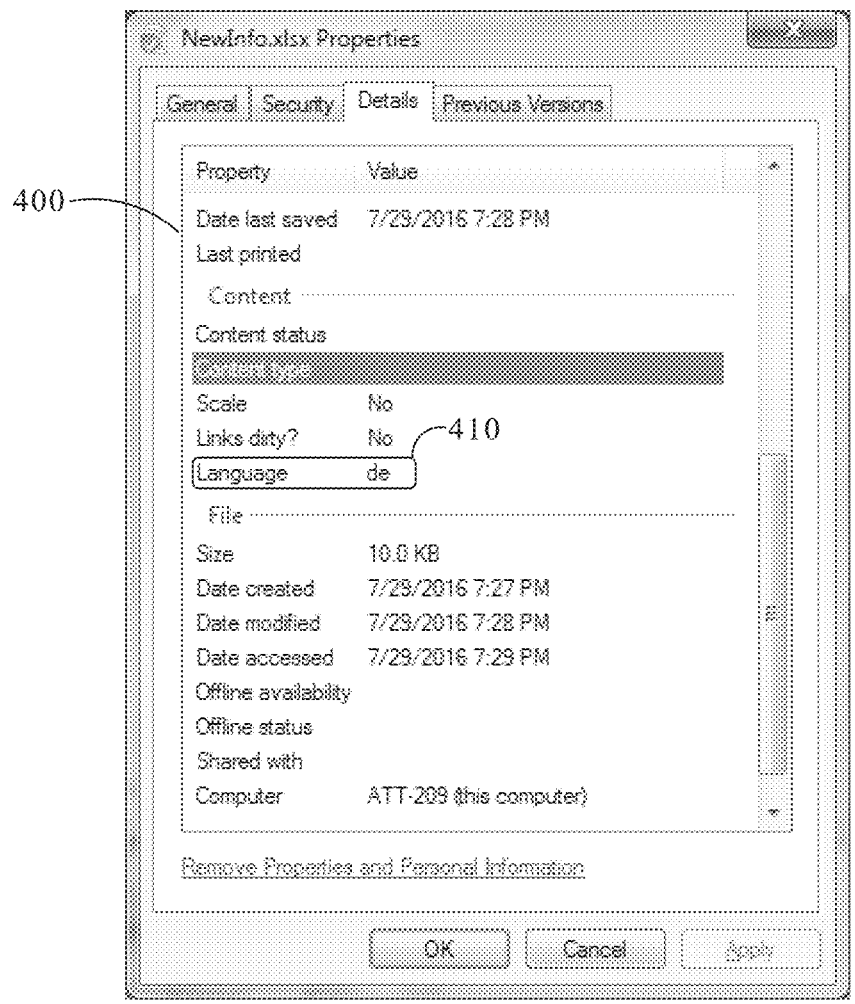
FIG. 4 describes an example of file metadata, according to an embodiment.

FIG. 4 describes an example of file metadata, according to an embodiment. In the example of FIG. 4, file metadata 400 contains locale metadata in form of language attribute 410. DPS 100 parses language attribute 410 to obtain the "de" language code describing the general German language for the document.

Similarly, document metadata for the received document may be obtained and parsed for locale metadata, as in block 220. For example, DPS 100 may obtain locale metadata from document metadata based on the document type or the type of request that initiated the processing of the document. At block 225, DPS 100 parses the obtained locale metadata, if any, and parses the attributes of the locale metadata. DPS 100 may be configured to parse the locale metadata attributes based on standards, such as the ISO-639 family of standards specifications, based on the document type, and/or based on the request type.

FIG. 5 describes an example of document metadata, according to an embodiment. In the example of FIG. 5, document metadata 500 contains locale metadata in form of language attribute 510. DPS 100 parses language attribute 510 to obtain the "de" language code describing the standard German language for the document.

At block 245, confidence value(s) for locales identified by the locale metadata are updated. For the calculation of the confidence value(s), each locale metadata may be assigned a different weight value representing the accuracy of locale metadata for determination of a document locale. DPS 100 may be configured to use different weight values based on the type of locale metadata and/or exclude a particular locale metadata from calculation. The granularity for the type of locale metadata to assign a particular weight value may vary. For example, individual fields/attributes, such as Accept-Language" or "Content-Language" fields, may be assigned different weight values, or in another example, different source types for locale metadata, such as file locale metadata or document locale metadata, may be assigned different weight values. In an embodiment, weight values for locale metadata may be determined based on training regression models in which the outcome for a document locale is known.

Additionally or alternatively, an accuracy measurement value that represents a degree of accuracy for a locale attribute may be provided within locale metadata. Such accuracy measurement value may be used in addition or in alternative to the weight value for the locale attribute of the locale metadata.

In an embodiment, at blocks 215, 217, 220, DPS 100 may identify multiple locale attributes and attribute values to update a confidence value for a particular locale. In such an embodiment, DPS 100 aggregates the weight values of the multiple locale attributes/attribute values to yield a single weight value for the particular locale. For the aggregation, DPS 100 may use one or more aggregation functions, such as summation, average, minimum or maximum.

Referring again to the example of HTTP request 300 in FIG. 3, in an embodiment, HTTP header metadata 310 contains locale metadata fields "Accept-Language" 312 and "Conent-Language" 314. Based on the prior accuracies of these fields, DPS 100 may assign the weight value of 0.6 out of 1.0 for "Accept-Language" field 312 and the weight value of 0.8 for "Content-Language" field 314. Based on these weight values, the German language confidence value is aggregated for the "de" and "de-ch" field values of attribute field 312 and the "de-ch" field value of attribute field 314. Additionally, the "de" field value of "Accept-Language" field 312 has an accuracy measurement value of "q=0.8" out of 1. DPS 100 may account for this measurement value and may aggregate this value with the weight value for "Accept-Language" field 312 by averaging them together ((0.6+0.8)/2) to get a new weight value 0.7. The total confidence value for the German language based on locale metadata in HTTP header 310 may be calculated by summing the locale metadata weight values for the German language (0.8+0.7+0.6) to yield 2.1. On the other hand, the English language confidence value may be updated to be 0.8 based on the "en" tag in the "Accept-Language" field 312.

In this example, DPS 100 may similarly calculate locality confidence value using locale metadata fields "Accept- Language" 312 and "Conent-Language" 314. Both field names contain field values with the "ch" tag value denoting Switzerland. Thus, DPS 100 accordingly aggregates the locality weight value into a locality confidence value for Switzerland. The locality confidence value for Switzerland may be calculated to be equal to the sum of 0.9 and 0.6, 1.5.

3.2 Language Confidence Based on Document Data Elements

In an embodiment, at block 230, the process obtains a document schema corresponding to the document that was received at block 210. For example, DPS 100 performs initial processing for a received document to obtain the schema for the document. For a document that uses an external stored schema, DPS 100 may obtain an identifier from the document to access the schema of the document. For a document that has self-descriptive schema, DPS 100 may scan or load the document for auto detection of the schema. Using the obtained/derived schema of the document, DPS 100 may identify sets of known-language data elements by obtaining known-language data schemas corresponding to the document's data schema.

Additionally or alternatively, at block 230, DPS 100 may obtain the sets of known-language document schemas for the received document based on at least a portion of the file name containing the document. The file name of the document may follow a particular naming convention that DPS 100 may parse and identify the corresponding set of known-language document schemas.

Additionally or alternatively, at block 230, DPS 100 may obtain the corresponding known-language document schemas based on the request that initiated the processing of the document by DPS 100. For example, continuing with FIG. 3's HTTP request 300 example, DPS 100 may identify the set of known-language document schemas based on the unique resource identifier (URI) 311 provided in HTTP header 310. DPS 100 may maintain a mapping between URIs and sets of known-language document schemas and uses such mapping for obtaining the set of known-language document schemas for the document based on URI 311. DPS 100 may also directly use one or more portions of URI 311 in HTTP header 310 to obtain the set of known-language document schemas for the document.

Each document schema in the obtained set of known-language document schemas is associated with a corresponding known language, in an embodiment. Table 1 below depicts examples of data schemes for URI 311 in English, German and French that may be stored in data store 172. Document schemas may be stored in data store 172 as semi-structured data files or in one or more database objects of a database. The actual methodology for storing sets of document schemas is not critical for the techniques described herein.

TABLE 1

Sets of Document Schemes for URI 311

| English | German | French |
|---|---|---|
| { | { | { |
| "$schema": "http://api.coupa.com/process_info/en/schema#", | "$schema": "http://api.coupa.com/process_info/de/schema#", | "$schema": "http://api.coupa.com/process_info/fr/schema#", |
| "title": "GeneralInformation", | "title": "AllgemeineInformationen", | "title": " informationsGénérales", |
| "type": "object", | "type": "object", | "type": "object", |
| "properties": { | "properties": { | "properties": { |
| "street": { | "straβe": { | "rue": { |
| "type": "string" | "type": "string" | "type": "string" |
| }, | }, | }, |
| "type": { | "art": { | "sorte": { |
| "type": "string" | "type": "string" | "type": "string" |
| "possiblevalues": ["residential", "business"] | "possiblevalues": ["geschäftsadresse", "wohnadresse"] | "possiblevalues": ["résidentielle", "entreprise"] |
| } | } | } |
| } | } | } |
| "title": "Invoice", | "title": "Rechnung", | "title": "Facture ", |
| "type": "object", | "type": "object", | "type": "object", |
| "properties": { | "properties": { | "properties": { |
| "amount": { | "betrag": { | "montant": { |
| "type": "string" | "type": "string" | "type": "string" |
| }, | }, | }, |
| "date": { | "datum": { | "date": { |
| "type": "string" | "type": "string" | "type": "string" |
| }, | }, | }, |
| "type": { | "sorte": { | "sorte": { |
| "type": "string" | "type": "string" | "type": "string" |
| } | } | } |
| } | } | } |
| } | } | } |

At block 235, DPS 100 selects data elements from the received document based on the schema of the document. At block 240, the selected data elements are compared with the sets of known-language data elements to update the language confidence value(s) for the document. In an embodiment, each selected data element is compared to data elements defined in the obtained set of known-language document schemes. If any known-language data element within a particular known-language document scheme matches to the selected unknown-language data element, the confidence value for the language of the particular known-language document scheme is updated for the document. The update to the confidence value for the language represent a higher level of machine confidence that the document is expressed in that language. Thus, with each match of unknown-language data element to a language-known data element associated with that language, the confidence value for that language changes to represent a higher level of machine confidence that the document is indeed expressed in that language.

In an embodiment, multiple language confidence values are updated for the received document. A selected data element of the document may match to known-language data elements in multiple known-language document schemes for different languages. Additionally or alternatively, different selected data elements may each match to a different known language data element in different known-language document schemes for different languages. Accordingly, DPS 100 maintains and updates separate confidence values for each of the different languages.

The updates to language confidence value(s) based on unknown-language data element matches, as performed at block 245, may differently affect the level of machine confidence in corresponding languages. In an embodiment, the change in the confidence value depends on a weight value assigned to the data element which match with known-language data-element is causing the change. The weight value represents the accuracy of the data element for determination of document language. DPS 100 may be configured to use different weight values based on types of unknown-language data elements and/or may be configured to completely exclude a particular data element (or type of data element) from the calculation of the confidence value(s).

In such an embodiment, different types of data elements in the document may be assigned different weight values. In particular, data field names may be assigned different weight values than data values. For example, in documents containing JSON semi-structured data, object names may be assigned different weight values than JSON attribute names, and JSON attribute names may be assigned different weight values than JSON attribute values. Similarly, for XML, semi-structured data, tag names may be assigned different weight values than XML, attribute names, and XML attribute names may be assigned different values than XML attribute values. For CSVs and other tabular data like IDoc's (Intermediate Documents) and spreadsheets, field names may be assigned different weight values than field data values. In an embodiment, the different weight values for data elements may be determined based on training regression models in which the outcome for a document language is known.

When an unknown-language data element is matched to a known-language data element, DPS 100 may assign the corresponding weight value for the match based on the type of the unknown-language data element. In an embodiment in which there are multiple matches for a particular language, DPS 100 aggregates the weight values from the multiple matchings for the particular language at block 240 to update the confidence value of the particular language at block 245. The aggregation of the weight values may be based on one or more aggregation functions, such as summation, average, maximum and minimum.

For example, continuing with the FIG. 3's HTTP request 300 example, DPS 100 may use the set of known-language data schemes in Table 1 to compute confidence value(s) for languages of the received JSON document 320. DPS 100 may be configured to assign a weight value of 0.8 out of 1.0 for each successful match of an unknown-language object name, a weight value of 0.6 out of 1.0 for each successful match of an unknown-language attribute name, and a weight value of 0.4 out of 1.0 for each successful match of an enumeration type attribute value.

Object names 321 and 325 in document 320 are matched only with the German document schema data elements in Table 1. Thus, according to the weight value assigned to object names, the confidence value for the German language is increased by the sum of 1.6 (0.8*2). For attribute names in document 320, attribute names "straBe" 322 and "sorte" 329 match with German data elements in Table 1 causing the confidence value for German to be further increased by 1.2 (2*0.6) to 2.8. Document 320 has data elements that match to other languages as well: attribute names "type" 324, "amount" 326 and "date" 328 match with data elements in the English document schema of Table 1. Thus, DPS 100 updates the English confidence value to 1.8 (3*0.6). The French document schema data elements are also matched by attribute names "date" 328 and "sorte" 329, causing the confidence value for French to be assigned to 1.2 (0.6*2). Attribute value "Geschäftsadresse" 324 is further matched to an enumeration attribute values described in the German document schema of Table 1. Thus, the confidence value for German is further updated to increase by 0.4 to yield 3.2, while the confidence values for English and French stay at 1.8 and 1.2, respectively, as no other enumeration type attribute values are matched.

In an embodiment, at block 245, DPS 100 further aggregates language confidence value determined based on locale metadata with language confidence value determined from document data elements. Continuing with the example of FIG. 3, DPS 100 may aggregate the previously calculated language confidence value for the German and English languages from HTTP header 310, 2.1 and 0.8, respectively, with the confidence values for the German and English languages from data elements in document 320. Thus, the German confidence value may be updated based on sum-based aggregation to be 5.3 (2.1+3.2), and the English confidence value may be aggregated to be at 2.6 (0.8+1.6), while the language confidence values for the other languages determined from data elements of the document stay unchanged.

3.3 Locality Confidence Based on Document Data Elements

Additionally or alternatively, DPS 100 may update locality, as opposed to language, confidence value(s) based on data elements of the received document. In an embodiment, at block 235, the process selects document data element(s). For example, DPS 100 selects at block 235 those data elements that have locality based formatting for their respective data values. DPS 100 may select such data elements based on the document schema or based on scanning the received document for particular formats.

In an embodiment, DPS 100 uses a number format, date format and/or locality identifier such as a currency identifier within the received document to determine locality confidence value(s) for the document. The confidence value for each of such determinations may vary in geographical scope and may represent a region within a country, a country and/or a group of countries. Further, each of this different types of determinations may be assigned a different weight value. For example, the currency identifier based determination may be assigned the weight value of 0.8 out of 1.0, while the date/number-format based determination may be assigned the weigh value of 0.5 out of 1.0.

For example, continuing with the FIG. 3's HTTP request 300 example, DPS 100 may select, based on the data scheme of the document, "amount" attribute value 326 for the currency identifier and number format processing. The "CHF" value within "amount" attribute value 326 represents the Swiss Franc currency identifier, and thus, the locality confidence value for Switzerland previously computed to be 1.5, may be updated by 0.8 to yield 2.3.

The number format of "amount" attribute value 326 follows the dot-for-decimal format and thus, the locality confidence values for the group of countries that follow "decimal-point-mark" number format for numbers or currency values specifically are updated to 0.5. Examples of countries that use different decimal mark conventions are given in the article "Decimal_mark" at the path "wiki" at the domain "en.wikipedia.org".

In another embodiment, DPS 100 updates the confidence value for each country that uses the determined number format. All the countries that use the "decimal-point-mark" number format for currency values have their respective locality confidence values updated by 0.5. For example, the locality confidence value for Switzerland of 2.3, from the prior example, may be updated by 0.5 to yield 2.8.

DPS 100 may further select "date" attribute value 328 of FIG. 3 to determine locality confidence value(s) based on the date format. If either the first delimited value of "date" 328 or the second delimited value of "date" 328 is greater than 12, then the date format of "date" 328 can be determined to be "day-month-year" or "month-day-year." "Date" attribute value 328's first delimited value "21" is greater than 12, thus DPS 100 determines that the first delimited value represents a calendar day and the second delimited value, "2," which is less than or equal to 12, represents a calendar month. The locality confidence value for the group of countries that follow "day-month-year" format for date values is updated to 0.5. An example of date formats by country is given in the article "Date_format_by_country" at the path "wiki" at the domain "en.wikipedia.org".

In another embodiment, DPS 100 updates the confidence value for each country that uses the determined date format. Thus, according to this example, all the countries that use the "day-month-year" date format for date values have their respective locality confidence values increased by 0.5. For example, the locality confidence value for Switzerland of 2.8, from the prior example, may be updated by 0.5 to yield 3.3 because Switzerland follows the "day-month-year" date format.

In an embodiment, DPS 100 maintains in data store 172 a list of locality settings determined for the received document. The locality settings list may include a locality attribute with an attribute value describing a particular locality format for a data value within the received document. The locality setting list may include a locality value that represent the determined number format, date format and/or currency of the received document. DPS 100 may use the locality settings list for processing the received document and extracting the locality specific data.

3.3 Selecting Locale for Document

At block 250, the process tests or determines what prevailing language or locality exists based on the data developed in preceding steps. For example, DPS 100 selects the prevailing locale based on one or more determined locale confidence values. In one embodiment, the prevailing locale is selected by comparing locale confidence value(s) to threshold value(s). If the confidence value of any locale exceeds the threshold value, then the locale is a prevailing locale. After DPS 100 selects the prevailing locale, at block 255, the process of FIG. 2 is programmed to automatically process the document based on the prevailing language or locality. Processing at block 255 may involve any application-specific step, call, instruction, or operation that depends or varies based on the language or locality. Such processing may include validating the structure of a received document (for example, CSV column headers of a received document matching with the expected column headers in the determined locale) or validating data of the document (for example, in English, a CSV enumerated list field, indicating whether requisition is loaded to a user cart or submitted, accepts either "yes" or "cart" field values, but can also accept "si" or "carrito" field values, if the document locale is determined to be Spanish).

If no locale is determined to be prevailing at block 250, then DPS 100 designates the received document for manual locale determination at block 252.

The threshold value(s) for determination at block 250 may be statically pre-configured or dynamically determined by DPS 100. Each received document by DPS 100 may have its own set of dynamic threshold value(s) determined by DPS 100. In an embodiment, a language or locality threshold value is determined by computing the respective maximum locale confidence values that are possible for a received document. DPS 100 may sum all the language confidence values possible from locale metadata and data elements of the received document to determine the dynamic threshold language confidence value. In the example of FIG. 3 and using the calculations from the prior examples, the maximum confidence value for locale metadata 312 is the sum of 0.6, 0.6 and 0.7 to yield 1.9; the maximum confidence value for locale metadata 314 is 0.8. Thus, DPS 100 may determine the maximum confidence value for locale metadata of received document 320 is 2.7.

Similarly, DPS 100 may determine the maximum confidence value from data elements 320 to be the summation of: 1.6 (2*0.8) for object name data elements, (5*0.6) for attribute name data elements and 0.4 for the single enumeration type attribute value, to yield 4.0 for the maximum language confidence value for the data elements. The total maximum value for document 320 can be determined by summing the maximum from the locale metadata and the maximum from the data elements to yield 6.7.

In an embodiment, DPS 100 may be configured or programmed to use a particular percentage of a maximum locale confidence value as a threshold locale confidence value. Using the previously calculated example of the maximum language confidence value for the HTTP request 300 of FIG. 3, DPS 100 may be configured to have 50% of the maximum language confidence value as the threshold language confidence value for document 320. Thus, DPS 100 is to process document 320 based on a language for which the confidence value exceeds 3.35. From the previous examples, the German confidence value is determined to be 5.3, the English confidence value is 2.6, and the French confidence value is 1.2. From these language confidence values, DPS 100 determines that the confidence value for German exceeds the threshold confidence value, and selects German (and thus the German language document schemas) for automatically processing document 320.

In an alternative embodiment, DPS 100 determines dynamic threshold confidence value(s) based on the determined locale confidence values. DPS 100 may determine the language/locality dynamic threshold values based on (normalized) distribution of the determined confidence values for languages and localities, respectively. DPS 100 may calculate the mean and the standard deviations of the determined confidence values. A combination of the mean and certain multiples of standard deviation may be selected DPS 100 as a threshold value for the confidence values. For example, from the previous examples for FIG. 3's HTTP request 300, the German confidence value is determined to be 5.3, the English confidence value is 2.6 and the French confidence value is 1.2. DPS 100 calculates the average language confidence value to be 3.06 and the standard deviation 1.75, and uses pre-configured multiple of 1.5 for the standard deviation multiple to yield 5.67 for the dynamic language confidence threshold value. According to this example, no language confidence value exceeds the determined threshold and thus, DPS 100 designates document 320 for manual locale determination.

The techniques described herein, when implemented in computer programs and computer systems, permit the programs and systems to automatically determine the locale that is most appropriate for processing a particular electronic document, with no advance configuration or programming about the origin or locale of the document. The techniques make it possible to deploy a distributed system having many instances of the same application program code, hosted in computer systems in different countries, that can receive electronic documents from other systems in other countries and automatically determine which locale is correct for processing the documents. Consequently, an instance of an application that is installed locally in a particular country does not require extensive configuration, special programming, or manual user action to accommodate inbound electronic documents from other places. Instead, the data sources, heuristics and algorithms that have been disclosed herein permit the system to automatically identify a locale so that other logic specific to that locale can be used to accurately process the document. In particular, techniques described herein reduce or eliminate configuration necessary for automatic processing of documents that are of diverse locales due to geographical diversity of originating client devices. In cloud computing, the techniques reduce infrastructure and code complexity for document processing by further integrating access points necessary to receive and process diverse locale documents.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
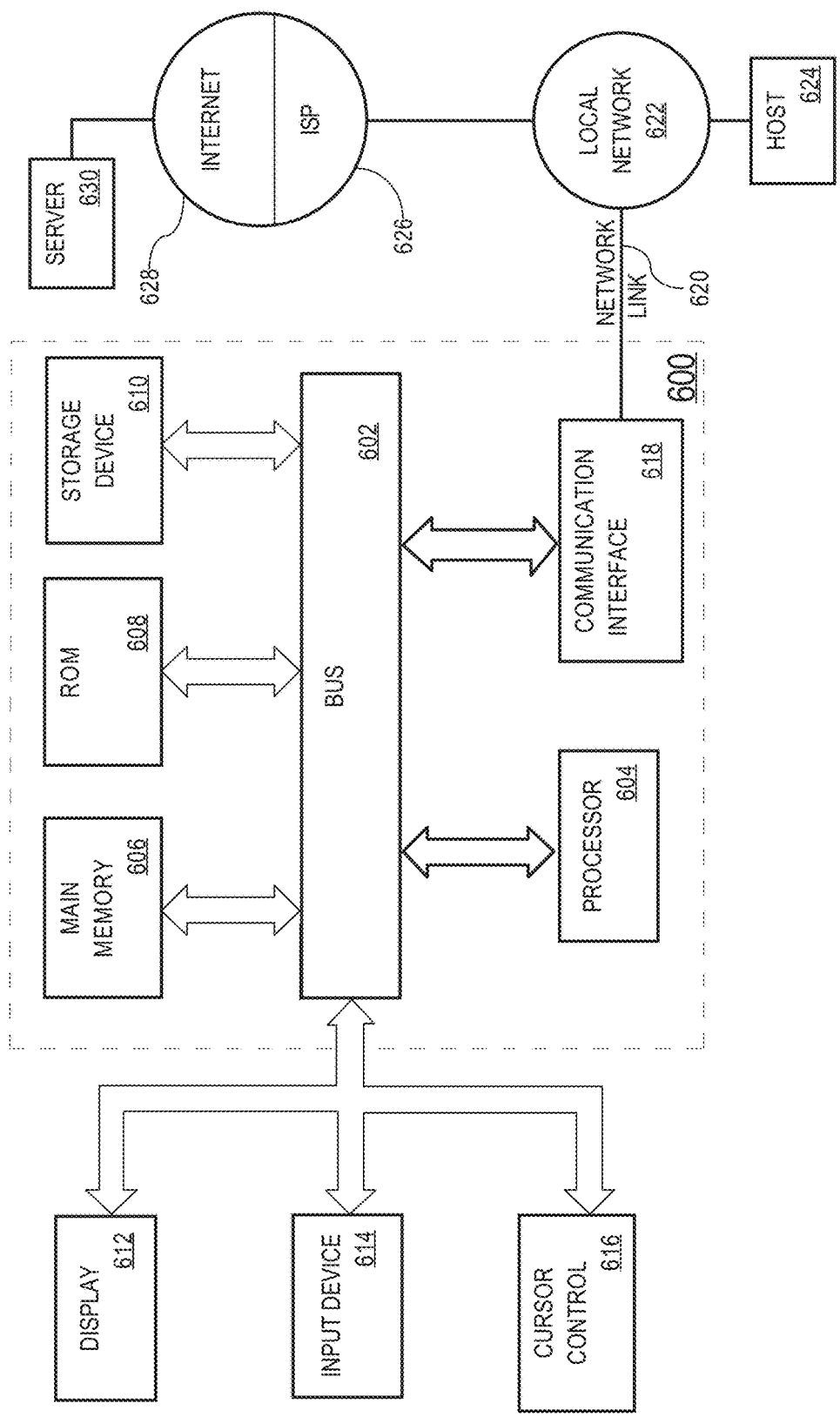
FIG. 6 is a block diagram that illustrates a computer system upon which an embodiment of the system may be implemented.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

5.0 Extensions and Alternatives

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing method comprising:
   receiving, at a server computer, an electronic document comprising a plurality of unknown-language data elements each associated with one or more types;
   assigning to at least one unknown-language data element, of the plurality of unknown-language data elements, a weight value based on a type, of the one or more types, of the at least one unknown-language data element;
   determining that a data value of the at least one unknown-language data element has matched to a data value of at least one known-language data element associated with a particular language;
   based at least in part on the weight value assigned to the at least one unknown-language data element, determining a language confidence level value specifying a level of machine confidence that the document is expressed in the particular language.

2. The method of claim 1, further comprising selecting the at least one unknown-language data element from the plurality of unknown-language data elements based on at least one of: a document type of the document or a document schema of the document.

3. The method of claim 1, further comprising:
   receiving the document as part of receiving a request to process the document, the request comprising one or more additional data elements;
   selecting an additional data element that indicates possible language for the request, the additional data element assigned to a particular weight;
   based on a data value of the additional data element and the particular weight, adjusting the language confidence level value for the document.

4. The method of claim 1, wherein the type of the at least one unknown-language data element is a data field name of the at least one unknown-language data element or the data value of the at least one unknown-language data element of the document.

5. The method of claim 1, wherein determining that the data value of the at least one unknown-language data element has matched to the data value of the at least one known-language data element comprises comparing the data value of the at least one unknown-language data element to data values of a plurality of known-language data elements.

6. The method of claim 5, wherein the comparing further comprises stemming the at least one unknown-language data element to match with the data values of the plurality of known-language data elements.

7. The method of claim 1, further comprising, based on the language confidence level value for the particular language exceeding a language threshold value, automatically processing the document using the particular language.

8. The method of claim 7, further comprising determining the language threshold value based on a maximum language confidence level value possible for the document.

9. The method of claim 7, further comprising determining the language threshold value based on a plurality of language confidence level values, for a plurality of languages, determined for the document that includes the language confidence level value.

10. A data processing method comprising:
    receiving, at a server computer, an electronic document comprising a plurality of unknown-locality data elements;

selecting at least one unknown-locality data element of the plurality of unknown-locality data elements such that the at least one unknown-locality data element has a data value that can vary in formats based on an actual locality of the document;

based on a type of the at least one unknown-locality data element, assigning to the at least one unknown-locality data element a weight value;

based on a format of the data value, determining at least one possible locality with which the format of the data value of the at least one unknown-locality data element is associated;

based at least in part on the weight value of the at least one unknown-locality data element, determining a machine confidence level value for the at least one possible locality to be the actual locality of the document.

11. The method of claim 10, wherein the format of the data value is based at least on one of the following: a date format, a number format, or a currency value format.

12. The method of claim 10, further comprising, based on the machine confidence level value for the at least one possible locality exceeding a threshold value, automatically processing the document using the at least one possible locality.

13. A server computer system comprising:
one or more processors;
one or more storage media storing one or more computer programs for execution by the one or more processors, the one or more computer programs comprising instructions for:
receiving, at the server computer system, an electronic document comprising a plurality of unknown-language data elements each associated with one or more types;
assigning to at least one unknown-language data element, of the plurality of unknown-language data elements, a weight value based on a type, of the one or more types, of the at least one unknown-language data element;
determining that a data value of the at least one unknown-language data element has matched to a data value of at least one known-language data element associated with a particular language;
based at least in part on the weight value assigned to the at least one unknown-language data element, determining a language confidence level value specifying a level of machine confidence that the document is expressed in the particular language.

14. The system of claim 13, wherein the one or more computer programs further comprise instructions for selecting the at least one unknown-language data element from the plurality of unknown-language data elements based on at least one of: a document type of the document or a document schema of the document.

15. The system of claim 13, wherein the one or more computer programs further comprise instructions for:
receiving the document as part of receiving a request to process the document, the request comprising one or more additional data elements;
selecting an additional data element that indicates possible language for the request, the additional data element assigned to a particular weight;
based on a data value of the additional data element and the particular weight, adjusting the language confidence level value for the document.

16. The system of claim 13, wherein the type of the at least one unknown-language data element is a data field name of the at least one unknown-language data element or the data value of the at least one unknown-language data element of the document.

17. The system of claim 13, wherein the one or more computer programs further comprise instructions for comparing the data value of the at least one unknown-language data element to data values of a plurality of known-language data elements.

18. The system of claim 13, wherein the one or more computer programs further comprise instructions for, based on the language confidence level value for the particular language exceeding a language threshold value, automatically processing the document using the particular language.

19. The system of claim 18, wherein the one or more computer programs further comprise instructions for determining the language threshold value based on a maximum language confidence level value possible for the document.

20. The system of claim 18, wherein the one or more computer programs further comprise instructions for determining the language threshold value based on a plurality of language confidence level values, for a plurality of languages, determined for the document that includes the language confidence level value.

* * * * *